(12) United States Patent
Shafai et al.

(10) Patent No.: US 10,917,680 B2
(45) Date of Patent: Feb. 9, 2021

(54) DISTRIBUTING CONTENT TO RENDER AT VEHICLES

(71) Applicant: UVERTZ, LLC, Beverly Hills, CA (US)

(72) Inventors: John Z. Shafai, Malibu, CA (US); Khalil M. Dhouti, Chandler, AZ (US)

(73) Assignee: UVERTZ, LLC, Beverly Hills, CA (US)

( * ) Notice: Subject to any disclaimer, the term of this patent is extended or adjusted under 35 U.S.C. 154(b) by 0 days.

(21) Appl. No.: 16/148,654

(22) Filed: Oct. 1, 2018

(65) Prior Publication Data

US 2020/0107064 A1    Apr. 2, 2020

(51) Int. Cl.
| | | |
|---|---|---|
| H04N 21/414 | (2011.01) | |
| H04N 21/2543 | (2011.01) | |
| H04N 21/262 | (2011.01) | |
| H04N 21/258 | (2011.01) | |

(52) U.S. Cl.
CPC ... *H04N 21/41422* (2013.01); *H04N 21/2543* (2013.01); *H04N 21/25841* (2013.01); *H04N 21/26225* (2013.01)

(58) Field of Classification Search
CPC ....... H04N 21/41422; H04N 21/26225; H04N 21/2543; H04N 21/25841
See application file for complete search history.

(56) References Cited

U.S. PATENT DOCUMENTS

| | | | |
|---|---|---|---|
| 6,060,993 A | * | 5/2000 | Cohen .................... G08G 1/123 340/691.6 |
| 6,690,286 B2 | | 2/2004 | Polyakov |
| 6,898,517 B1 | | 5/2005 | Froeberg |

(Continued)

FOREIGN PATENT DOCUMENTS

| | | |
|---|---|---|
| CN | 1825398 | 8/2006 |
| CN | 101398996 | 4/2009 |

(Continued)

OTHER PUBLICATIONS

Abstract and Machine Translation for CN Publication No. 102074121, dated May 25, 2011, 9 pp.

(Continued)

*Primary Examiner* — Hai V Tran
(74) *Attorney, Agent, or Firm* — David W. Victor; Konrad, Raynes, Davda and Victor LLP (57) ABSTRACT

Provided are a computer program product, system, and method for distributing content to render at vehicles. A content instance indicates content and a content time period and a content location at which the content is to be rendered during the content time period. For each group of content instances having a same location and a content time period comprising beginning at a current time, a determination is made of vehicles having a vehicle location within the content location. For each group of content instances, a determination is made of an assignment of the content instances to a vehicle of the determined vehicles. For each vehicle assigned the content instances, a content package is transmitted having content from the assigned content instances to cause the assigned vehicle to display the content on a display screen coupled to the vehicle to be viewed by people in a vicinity of the vehicle.

18 Claims, 7 Drawing Sheets

(56) References Cited

U.S. PATENT DOCUMENTS

| | | | |
|---|---|---|---|
| 7,038,637 | B1 | 5/2006 | Eller et al. |
| 7,154,383 | B2 | 12/2006 | Berquist |
| 8,390,475 | B2 | 3/2013 | Feroldi |
| 9,111,293 | B2 | 8/2015 | Kulkarni |
| 9,183,572 | B2 | 11/2015 | Brubaker |
| 9,355,409 | B2 | 5/2016 | Vallat et al. |
| 9,799,245 | B2 | 10/2017 | Kriezman |
| 9,934,709 | B2 | 4/2018 | Lanham |
| 9,959,792 | B2 | 5/2018 | Singireddy |
| 10,049,389 | B2 | 8/2018 | Rider et al. |
| 10,636,335 | B2 | 4/2020 | Kis-Benedek Pinero |
| 2002/0116717 | A1 | 8/2002 | Eller et al. |
| 2004/0036622 | A1 | 2/2004 | Dukach et al. |
| 2004/0192351 | A1 | 9/2004 | Duncan |
| 2009/0037273 | A1 | 2/2009 | Zhu |
| 2009/0144155 | A1* | 6/2009 | Lora .................... G06Q 30/02 |
| | | | 705/14.62 |
| 2009/0299857 | A1 | 12/2009 | Brubaker |
| 2010/0036717 | A1 | 2/2010 | Trest |
| 2011/0093330 | A1 | 4/2011 | Burckart et al. |
| 2012/0004961 | A1 | 1/2012 | Flynn |
| 2012/0265616 | A1 | 10/2012 | Cao et al. |
| 2012/0303458 | A1 | 11/2012 | Schuler, Jr. |
| 2013/0006775 | A1 | 1/2013 | Jordan et al. |
| 2013/0013412 | A1 | 1/2013 | Altman et al. |
| 2013/0138508 | A1 | 5/2013 | Gee |
| 2013/0246181 | A1 | 9/2013 | Lobsenz |
| 2013/0318182 | A1 | 11/2013 | Palnati et al. |
| 2014/0040016 | A1* | 2/2014 | Amla ..................... G09F 21/04 |
| | | | 705/14.45 |
| 2014/0249913 | A1 | 9/2014 | Endo |
| 2015/0029078 | A1 | 1/2015 | Jose |
| 2015/0058127 | A1 | 2/2015 | Abuelsaad et al. |
| 2015/0095124 | A1 | 4/2015 | Felt et al. |
| 2015/0220991 | A1 | 8/2015 | Butts et al. |
| 2015/0348112 | A1 | 12/2015 | Ramanujam |
| 2017/0124927 | A1 | 5/2017 | Kriezman |
| 2018/0204489 | A1 | 7/2018 | Lanham |
| 2018/0315359 | A1 | 11/2018 | Jo |

FOREIGN PATENT DOCUMENTS

| | | |
|---|---|---|
| CN | 102074121 | 5/2011 |
| CN | 105894320 | 8/2016 |
| CN | 107181972 | 9/2017 |
| CN | 107240365 | 10/2017 |
| CN | 107705733 | 2/2018 |
| CN | 207458535 U | 6/2018 |
| IN | 1431/CHE/2014 | 8/2014 |
| JP | 2002169496 | 6/2002 |
| JP | 2003099670 | 4/2003 |
| JP | 2004077519 | 3/2004 |
| JP | 2009080341 | 4/2009 |
| JP | 2009300910 | 12/2009 |
| JP | 2010054673 | 3/2010 |
| JP | 2013089096 | 5/2013 |
| JP | 2014147493 | 9/2014 |
| JP | 2014202859 | 10/2014 |
| KR | 10-2013-0118428 | 10/2013 |
| KR | 20140016206 | 2/2014 |
| TW | 201601131 | 1/2016 |
| WO | 2004081902 | 9/2004 |
| WO | 2012043394 | 4/2012 |
| WO | 2014026273 | 2/2014 |
| WO | 2017033089 | 3/2017 |
| WO | 2018068525 | 4/2018 |

OTHER PUBLICATIONS

Abstract and Machine Translation for JP Publication No. 2004077519, dated Mar. 11, 2004, 15 pp.

Abstract and Machine Translation for JP Publication No. 2009080341, dated Apr. 16, 2009, 11 pp.

Abstract and Machine Translation for JP Publication No. 2013089096, dated May 13, 2013, 13 pp.

Abstract and Machine Translation for KR Publication No. 20140016206, dated Feb. 7, 2014, 10 pp.

Abstract and Machine Translation for WO Publication No. 2012043394, dated Apr. 5, 2012, 12 pp.

Bunn, L., "On-Vehicle Digital Signage is on the Move", Digital Signage Today, [online], [Retrieved on Sep. 17, 2018], Retrieved from the Internet at <URL: https://www.digitalsignagetoday.com/articles/on-vehicle-digital-signage-i . . . >, 5 pp.

Firefly, "Earn Money While You Drive", [online], © 2018 fireflyon.com, [Retrieved on Jul. 31, 2018], retrieved from the Internet at <URL: https://fireflyon.com/drivers>, 3 pp.

Firefly, "Reach Your Audience with Precision", [online], © 2018 fireflyon.com, [Retrieved on Jul. 31, 2018], retrieved from the Internet at <URL: https://fireflyon.com/advertisers>, 4 pp.

Graham-Rowe, D., "In-Car Projection for Drive-By Advertising", New Scientist, May 4, 2011, 2 pp.

Johnson, T., "Target Customers on the Go With Hyperlocal Geofencing Ads", [online], Sep. 21, 2017, [Retrieved on Sep. 17, 2018], Retrieved from the Internet at <URL:https://www.cpcstrategy.com/blog/2017/09/hyperlocal-geofencing-ads/>, 8 pp.

Johnson, L., "This Startup Plans to Sell Advertising in Uber and Lyft Cars", [online], Apr. 14, 2015, [Retrieved on Sep. 17, 2018], Retrieved from the Internet at <URL: https://www.adweek.com/digital/startup-plans-sell-advertising-uber-and-l . . . >, 2 pp.

Primozic, U., "Real-Time Truck Displays Provide Location Triggered Ads, Traffic Information and More", [online], Sep. 12, 2016, [Retrieved on Sep. 17, 2018], Retrieved from the Internet at <URL: https://www.visionect.com/blog/electronic-paper-truck-displays/>, 3 pp.

Reynolds, B., "How Does Geofence Mobile Advertising Work", [online], [Retrieved on Sep. 17, 2018], Retrieved from the Internet at <URL: https://element502.com/how-does-geofence-mobile-advertising-work/>, 7 pp.

Said, C., "Uber, Lyft Car Ads Headed for San Francisco", [online], Apr. 6, 2018, [Retrieved on Sep. 17, 2018], Retrieved from the Internet at <URL: https://www.sfchronicle.com/business/article/Uber-Lyft-car-ads-headed-f . . . >, 6 pp.

Tepper, F., "Wrapify Is a Startup Paying Drivers to Wrap Their Car in Ads", [online], [Retrieved on Oct. 1, 2018], Retried from the Internet at <URL: https://techcrunch.com/2016/01/18/wrapify-is-a-startup-paying-drivers-to-wrap-their-car-in-ads/>, 3 pp.

Waivecar, "Flow it Works", [online], [Retrieved on Jul. 31, 2018], Retrieved from the Internet at <URL: https://www.waivecar.com/how-it-works.html>, 4 pp.

U.S. Appl. No. 16/148,700, entitled "Rendering Content at a Vehicle Transmitted from a Content Distribution System", Invented by J.Z. Shafai, et al., filed Oct. 1, 2018, 36 pp.

Abstract and Machine Translation of KR Publication No. 10-2013-0118428, dated Oct. 30, 2013, 14 pp.

International Search Report and Written Opinion (ISR & WO) for International Application No. PCT/US2019/052296, dated Jan. 9, 2020, 13 pp.

Office Action 1 for U.S. Appl. No. 16/148,700, dated Feb. 6, 2020, 30 pp.

List of Uvertz Patents or Patent Applications Treated as Related, Apr. 9, 2019, 2 pp.

U.S. Appl. No. 16/372,400, entitled "Transmitting Display Content to Vehicles to Render Contemporaneously During a Content Time Period With Related Content at a Display Screen", Invented by J.Z. Shafai, et al., filed Apr. 1, 2019, 42 pp.

Response to Office Action 1 for U.S. Appl. No. 16/148,700, dated Jul. 31, 2020, 17 pp.

Office Action 1 for U.S. Appl. No. 16/372,400, dated Mar. 6, 2020, 25 pp.

Response to Office Action 1 for U.S. Appl. No. 16/372,400, dated Jul. 31, 2020, 12 pp.

Machine Translation of JP Publication No. 2010054673, dated Mar. 11, 2010, 11 pp.

Machine Translation of JP Publication No. 2014147493, dated Sep. 22, 2014, 11 pp.

(56) References Cited

OTHER PUBLICATIONS

Final Office Action 1 for U.S. Appl. No. 16/148,700, dated Nov. 13, 2020, 29 pp.
Response to Final Office Action 1 for U.S. Appl. No. 16/148,700, dated Nov. 23, 2020, 11 pp.
Final Office Action 1 for U.S. Appl. No. 16/372,400, dated Nov. 13, 2020, 15 pp.
Response to Final Office Action 1 for U.S. Appl. No. 16/372,400, dated Nov. 23, 2020, 9 pp.
Notice of Allowance 1 for U.S. Appl. No. 16/148,700, dated Dec. 11, 2020, 16 pp.
Notice of Allowance 1 for U.S. Appl. No. 16/372,400, dated Dec. 14, 2020, 15 pp.

* cited by examiner

DISTRIBUTING CONTENT TO RENDER AT VEHICLES

BACKGROUND OF THE INVENTION

1. Field of the Invention

The present invention relates to a computer program product, system, and method for distributing content to render at vehicles.

2. Description of the Related Art

Vehicle mobile digital signage involves mounting a display screen on a car, typically the roof, and display advertisements while the car is driving around. The company Ozzy Media, Inc., operating as Firefly, provides drivers Internet mounted smart screens to mount on a roof rack on their car to serve targeted advertisements to display on the mounted digital screen based on a car's location, referred to as geo-fencing of advertisements. Mobile advertising on vehicles is very effective for reaching potential consumers and results in numerous impressions.

There is a need in the art for improved techniques for targeting content to digital signage deployed on vehicles to display while the vehicles are driving in an area.

SUMMARY

Provided are a computer program product, system, and method for distributing content to render at vehicles. A vehicle database maintains vehicle information indicating, for each vehicle of a plurality of vehicles, a vehicle location value. A subscription database has subscriber information for each of a plurality of subscribers, having content instances. Each content instance indicates content and a content time period and a content location at which the content is to be rendered during the content time period. For each group of content instances in the subscriber information for the subscribers having a same location and a content time period comprising beginning at a current time, a determination is made of vehicles having a vehicle location within the content location. For each group of content instances, a determination is made of an assignment of the content instances to a vehicle of the determined vehicles. For each vehicle assigned the content instances, a content package is transmitted having content from the assigned content instances to cause the assigned vehicle to display the content on a display screen coupled to the vehicle to be viewed by people in a vicinity of the vehicle.

Additionally, for each assigned vehicle assigned the content instances, the content package is generated having the content, the content location, and the content time period for the content to cause the content from the content instances to be rendered on the display screen of the assigned vehicle until an end of the time period and while the assigned vehicle is located within the content location.

Additionally, a plurality of content instances for subscribers further indicate a content traffic density value at which the content is to be rendered. The vehicle information for each vehicle indicates a vehicle traffic density value of a traffic density in an area of the vehicle. For each group of content instances further having a same content traffic density value, the determined vehicles further have a vehicle traffic density value comprising the content traffic density value.

Additionally, for each assigned vehicle assigned the content instances, the content package is generated having the content, the content location, the content time period, and the content traffic density value for the content to cause rotating rendering of the content from the assigned content instances on the display screen of the assigned vehicle until an end of the time period and while the vehicle is located within the content location and within traffic having the content traffic density value.

Additionally, each content instance indicates a priority value of one of a plurality of priorities for the content. Determining the assignment of the content instances to the determined vehicles comprises assigning content instances having a higher priority value to vehicles having a vehicle location in the content location before assigning content instances with a same content location having a lower priority value. There are a maximum number of content instances that can be assigned to each vehicle.

Additionally, the priority value comprises a price paid by a subscriber to distribute the content at the content time period to the content location. Higher prices paid have a higher priority value than lower prices paid.

Additionally, the vehicle information indicates accrued earnings for the vehicle. A complete packet is received indicating content display times for displaying content from content instances assigned to the vehicle having the display screen at which the content is displayed. A determination is made of a fee associated with a lowest priority value of all assigned content instances having a same content time period and content location as that of the content instances having content identified in the complete packet. Earnings are calculated based on the content display times and the determined fee. The earnings are incremented by the calculated earnings.

DETAILED DESCRIPTION

Current mobile digital signage involves providing very expensive rooftop display systems to allow ads to be transmitted to the display system to display on the vehicle. These costs limit the ability to expand the driver base because of the large capital outlays required to install digital signage on the automobiles to render advertisements. Further, prior art rooftop digital display systems may have to be wired to a car's electrical system. Further, displaying ads on a side of the vehicle limits the viewership. These costs and limitations associated with current mobile digital advertising has limited wide scale adoption and expansion of digital signage.

Described embodiments provide improved computer technology and systems to distribute subscriber content to vehicles to satisfy subscriber parameters for the content. Described embodiments provide a vehicle database having vehicle information indicating, for each vehicle of a plurality of vehicles, a vehicle location value. A subscription database has subscriber information for each of a plurality of subscribers, having content instances. Each content instance indicates content, a content time period, and a content location at which the content is to be rendered during the content time period. For each group of content instances in the subscriber information for the subscribers having a same location and a content time period that begins at a current time, a determination is made of vehicles having a vehicle location within the content location. For each group of content instances, a determination is made of an assignment of the content instances to a vehicle of the determined vehicles. For each vehicle assigned the content instances, a content package having content from the assigned content instances is transmitted to the assigned vehicle to cause the assigned vehicle to display the content on a display screen coupled to the vehicle to be viewed by people in a vicinity of the vehicle.

The described embodiments provide databases and computer technology to match subscriber content to vehicles that satisfy the subscriber criteria for distributing. Described embodiments form content packets to transmit content assigned to a vehicle to the assigned vehicle to render at the vehicle. The content in the content packets may come from different subscribers, but have the same distribution criteria, such as time period, location, traffic density, etc., so that content may be bundled in one content packet to provide to one vehicle to render on a display screen at the vehicle to satisfy the subscriber distribution criteria.

An additional embodiment provides improved techniques for distributing components to an operator of a vehicle, including a projector, a display screen, and computer program stored in a mobile computing device in the vehicle. The mobile communication device may also be distributed to the operator of the vehicle or the operator may provide the mobile communication device in the form of a smartphone. The display screen is attached to the interior of the vehicle to stream content from the mobile computing device included in a content packet transmitted from the content distribution system. This allows for the wide scale adoption of the content delivery system at vehicles by providing relatively low cost components, including a projector, display screen, to attach to a window, and a computer program to reduce the cost of wide scale deployment. Further, the distributed computer programs deployed in the vehicles may enforce subscriber requirements for rendering the content, such as time period, location, and traffic density, to ensure the rendering of the content on the display screen satisfies subscriber requirements.

Figure 1:
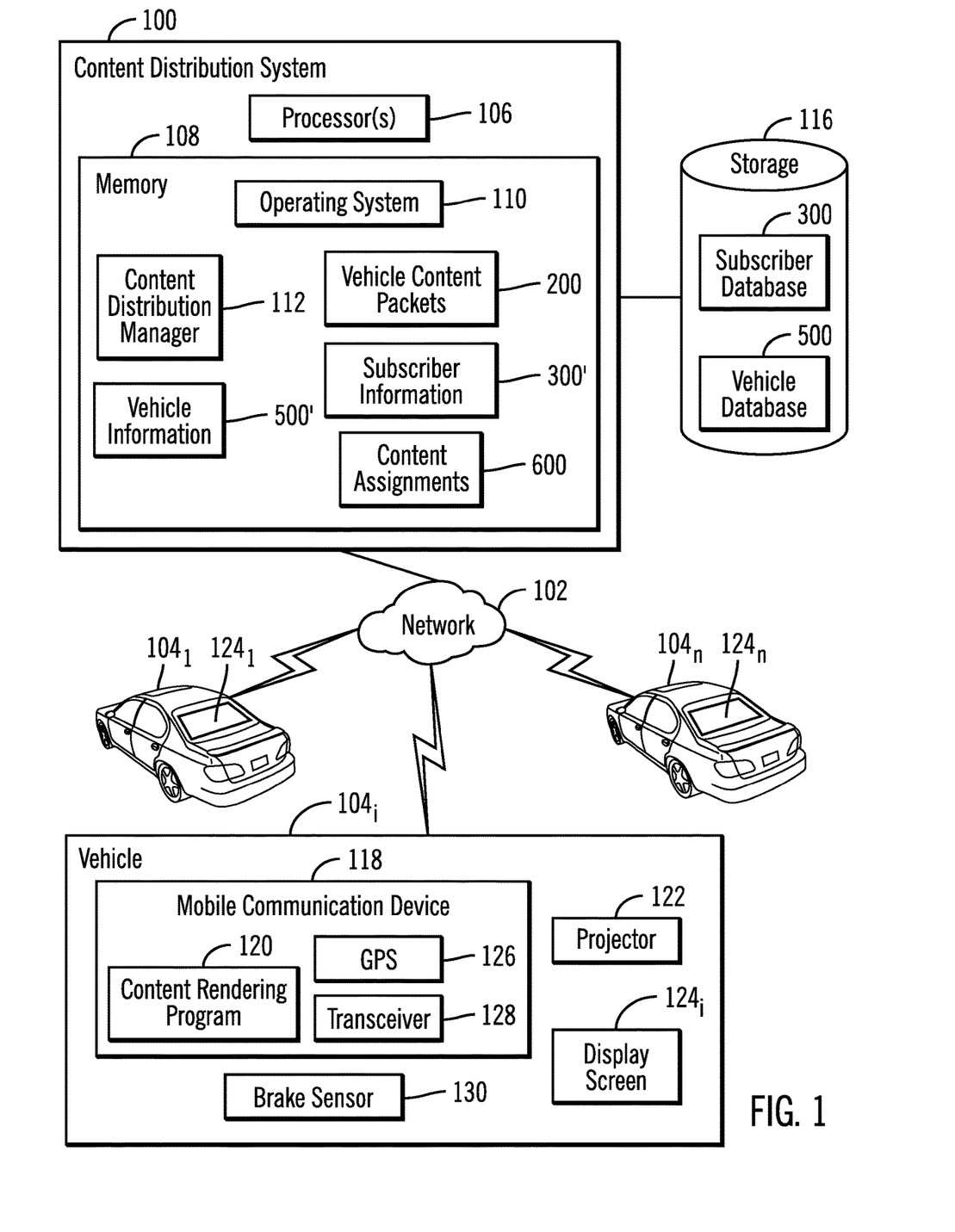
FIG. 1 illustrates an embodiment of a content distribution environment.

FIG. 1 illustrates an embodiment of a content distribution environment including a content distribution system 100 to distribute targeted content over a network 102 to vehicles $104_1, 104_i \ldots 104_n$ driving in the same or different regions. The content distribution system 100 comprises one or more processors 106, a main memory 108 including various program components including an operating system 110, and a content distribution manager 112 to generate vehicle content packets 200 to transmit to motor vehicles $104_1, 104_i \ldots 104_n$ over the network 102, where the network 102 transmits information to the vehicles $104_1, 104_i \ldots 104_n$ over a wireless network 102. The content distribution system 100 is in communication with a storage 116 having a subscriber database 300 having subscriber information on subscribers providing content to distribute to the vehicles $104_1, 104_i \ldots 104_n$ and a vehicle database 500 having vehicle information on vehicles $104_1, 104_i \ldots 104_n$ registered with the content distribution system to display content provided by subscribers. An instance of the subscriber information 300' from the subscriber database 300 and vehicle information 500' from the vehicle database 500 may be stored in the memory 108 for access.

The content distribution manager 112 may maintain content assignments 600 providing information on content from subscribers assigned to vehicles $104_1, 104_i \ldots 104_n$ to which the content is distributed over the network 102.

Each vehicle $104_1, 104_i \ldots 104_n$ may include the components shown in vehicle $104_i$, including a mobile communication device 118 storing a content rendering program 120 executed in the mobile communication device 118 to receive vehicle content packets 200 from the content distribution system 100 and generate content to stream to a projector 122 to cause the display of the content on a display screen 124 affixed to the vehicle $104_i$. The mobile communication device 118 further includes a Global Positioning System (GPS) 126 to determine a location of the mobile communication device 118 and a wireless transceiver 128 to allow wireless communication with devices, such as BLUETOOTH®, wireless local area networking, e.t., WI-FI™, etc. The mobile communication device 118 may comprise a smartphone, a RASBERRY PI®, or other dedicated communication and processing device. The mobile communication device 118 may communicate with the projector 122 via wireless communication or through a cable connecting the mobile communication device 118 to the projector 122. In alternative embodiments, there may be no projector 122 and the mobile communication device 118 may stream content directly to the display screen $124_i$ to directly render. (Bluetooth is a registered trademark of the Bluetooth Special Interest Group, WIFI is a trademark of the Wi-Fi Alliance, Rasberry Pi is a registered trademark of the Rasberry Pi Foundation).

In one embodiment the display screen $124_i$ may be affixed to an inside of the rear window, as shown with display screens $124_1$ and $124_n$. For instance, in one embodiment, the display screen 124 may comprise a thin film or flexible display, such as a rollable display screen, a projection screen, etc. In certain embodiments, the display screen $124_i$ may have an adhesive on one side to adhere to the inside of the rear window, as shown with display screens $124_1$ and $124_n$. Alternatively, the display screen 124 comprising a thin film display may adhere to the window of the vehicle $104_i$ by static cling.

The projector 122 may be affixed to an inside surface of the vehicle $104_i$ and project the streamed content onto the display screen such as through a projection system. In an alternative embodiment, the projector 122 may be physically coupled to the display screen $124_i$ to project content to the display screen elements. In one embodiment, the display screen $124_i$ may comprise a one-way transparent display to allow the driver to see through the rear window from the inside of the car while content is displayed on a surface of the display screen $124_i$ facing outward from the vehicle to be visible to persons external to the vehicle $104_i$, such as a see through display, transparent Liquid Crystal Display (LCD), transparent organic light-emitting diode (OLED), etc. In thin film embodiments, the display screen $124_i$ may comprise Vistique Clear Film from Vislogix, Inc.

The vehicle $104_i$ may further have a brake sensor 130 coupled to the brake pedal to mechanically detect depression of the brake pedal or the brake sensor 130 may be coupled to the vehicle $104_i$ electrical system to detect when the brakes are being applied so as to cause the rendering of a brake notification with the content simultaneously rendered on the display screen $124_i$ to alert drivers behind the vehicle $104_i$ that the brakes are being applied.

Further, the mobile communication device 118, projector 122, and display screen $124_i$ may continue to render content to persons external to the vehicle while the vehicle is in a parked or stopped state so that people may continue to view content at the location of the vehicle.

With the embodiment of FIG. 1, the operator of the content distribution system 100 may provide drivers, such as ride-sharing drivers, the display screen $124_i$ and projector 122 to affix to their car. In embodiments where the mobile communication device 118 comprises a smartphone, a driver may then download the content rendering program 120 to their smartphone to use to stream content to the projector 122 to then project onto the display screen $124_i$. In further embodiments, the operator of the content distribution system 100 may further provide the mobile communication device 118 that is used to receive the vehicle content packets 200 and stream content therein to the projector 122.

The content distribution system 100 may comprise one or more servers, where the components and functions of the content distribution manager 112 may be implemented in one or more servers. The vehicle $104_i$ may comprise any type of motor vehicle, personal vehicle, commercial, truck, bus, car, autonomously driven car, etc. The content distribution system 100 may store program components and corresponding data, such as 110, 112, 200, 300', 500', and 600 may be stored in a non-volatile storage (not shown) and loaded into the memory 104, which may comprise a suitable volatile or non-volatile memory devices, including those described above. The storage 116 may comprise a non-volatile storage system coupled directly to the content distribution system 100 or the content distribution system 100 may communicate with the storage 116 over a network.

Generally, program modules, such as the program components 112, 120 may comprise routines, programs, objects, components, logic, data structures, and so on that perform particular tasks or implement particular abstract data types. The program components and hardware devices of the content distributions system 100 and mobile communication device 118 of FIG. 1 may be implemented in one or more computer systems, where if they are implemented in multiple computer systems, then the computer systems may communicate over a network.

The content distribution manager 112 may be accessed by the processor 106 from the memory 104 to execute. The content rendering program 120 may be executed by a processor in the mobile communication device 118. Alternatively, some or all of the program components 112, 120 may be implemented in separate hardware devices, such as Application Specific Integrated Circuit (ASIC) hardware devices.

The functions described as performed by the programs 112, 120 may be implemented as program code in fewer program modules than shown or implemented as program code throughout a greater number of program modules than shown.

The network 102 may comprise a cellular network, the Internet, etc.

Figure 2:
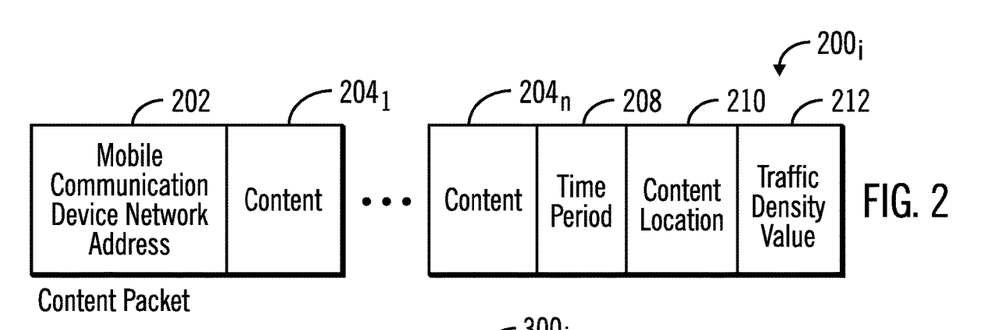
FIG. 2 illustrates an embodiment of a content packet.

FIG. 2 illustrates an embodiment of an instance $200_i$ of a content packet generated by the content distribution manager 112 to direct to a particular vehicle $104_1, 104_i \ldots 104_n$, and includes a mobile communication device network address 202 in a vehicle $104_i$ to which the content is targeted; one or more instances of content $204_1 \ldots 204_i$ such as video or still images; a time period 208 during which the content is displayed $204_1 \ldots 204_n$, e.g., one or more time ranges within a day, multiple days, etc.; a content location 210 within which the content $204_1 \ldots 204_n$ is to be displayed, such as a region or bounded area of Global Positioning System (GPS) coordinates, such as a city, township, part of town, shopping area, e.g., the Golden Triangle of Beverly Hills, Upper East Side of Manhattan, etc., or other identifiable or user defend area, also known as a geo-fence. A geo-fence comprises a geographic boundary, defined by GPS or other technology, that enables software to trigger a response when a mobile device enters or leaves a particular area; and a traffic density value 212 indicating a traffic density, e.g., light, moderate, heavy, in which the content $204_1 \ldots 204_n$ should be displayed. Content $204_1 \ldots 204_n$ instances may each be displayed for a set duration in continual loops during the time period 208 while the vehicle, identified by the mobile communication device address 202, is present within the content location 210 and traffic density 212.

Figure 3:
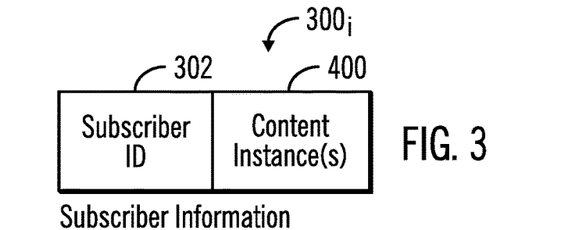
FIG. 3 illustrates an embodiment of subscriber information.

FIG. 3 illustrates an embodiment of an instance of subscriber information $300_i$ in the subscriber database 300 providing information on content provided by a subscriber, including a subscriber identifier (ID) 302; one or more content instances 400 that the subscriber 302 has transacted to have distributed to vehicles $104_1, 104_i \ldots 104_n$ to display. In certain embodiments, the subscriber may have purchased to have their content instances 400 distributed to vehicles, which may comprise advertisements or other types of contents. An online auction system, such as used with Google® ADWORDS®, may be used to enable subscribers to bid to have their content distributed to vehicles $104_1, 104_i \ldots 104_n$ based on location, time period, and traffic density, where subscribers may pay more to have content distributed to more high traffic and high density locations with numerous potential customers during time periods where potential customers are likely to be present at the content location. (Google and ADWORDS are registered trademarks of Google LLC throughout the world).

Figure 4:
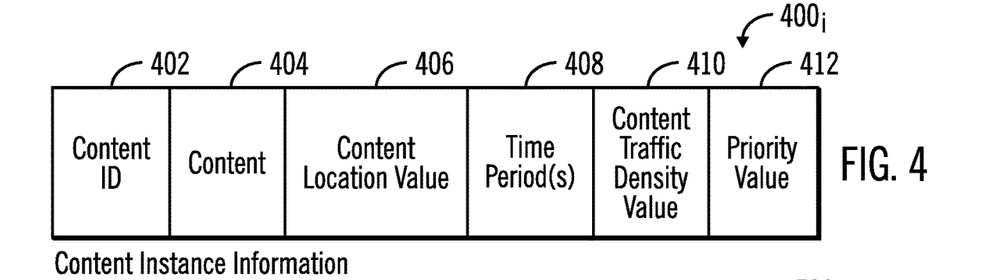
FIG. 4 illustrates an embodiment of content instance information.

FIG. 4 illustrates an embodiment of a content instance $400_i$ provided by a subscriber 302, and includes: a content identifier (ID) 402; a content instance 404, such as a video, still image, etc.; a content location value 406 indicating a region in which the content 404 is to be displayed, i.e., geo-fence; one or more time periods 408 during which the content 404 is to be displayed; a traffic density value 410 indicating a traffic density in which the content 404 should be displayed, such as a minimum traffic density; and a priority value 412 indicating a priority associated with the content 404 to be rendered, which may indicate a maximum payment the subscriber has made to distribute the content 404, such that content having a higher priority value 412, higher fee paid, is preferred to transmit to vehicles $104_1, 104_i \ldots 104_n$ satisfying the criteria for rendering the content 404, 406, 408 over content 404 having a lower priority value if there is limited space available at the vehicles $104_1$, $104_i \ldots 104_n$ to display the content according to the criteria 404, 406, 408 for rendering content.

In further embodiments, there may be additional subscriber criteria for rendering content, in addition to location, time period, traffic density, and priority value.

Figure 5:
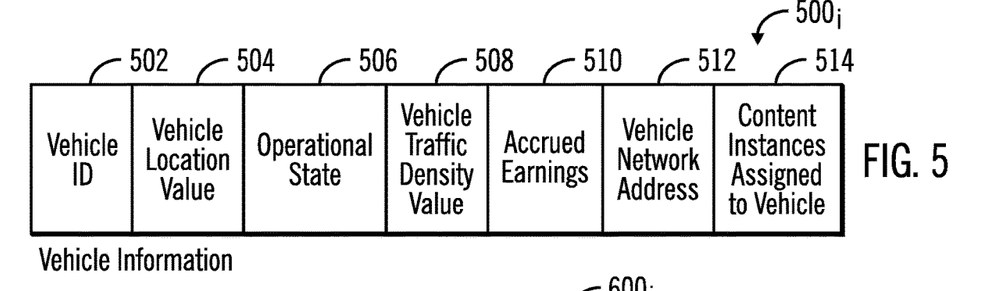
FIG. 5 illustrates an embodiment of vehicle information.

FIG. 5 illustrates an embodiment of an instance of vehicle information $500_i$ in the vehicle database 500 having information on the vehicles $104_1, 104_i \ldots 104_n$ that have registered to stream distributed content, including a vehicle identifier (ID) 502; a vehicle location value 504 indicating a current location of the vehicle determined from a GPS signal from the vehicle mobile communication device 118; an operational state 506 indicating whether the vehicle is operating or off; a traffic density value 508 indicating the traffic density at the vehicle location 504, which may be determined by contacting a traffic server over the network 102; accrued earnings 510 indicating an amount the vehicle operator has earned by rendering content on the display screen $124_i$ of the vehicle $104_i$; a vehicle network address 512 used to communicate with the mobile communication device 118 associated with the vehicle 502; and content instances assigned to the vehicle 514 to render during a time period.

In one embodiment, the vehicle location value 504 may be determined by the mobile communication device 118 and transmitted to the content distribution manager 112. The vehicle traffic density value 508 may be determined by the mobile communication device 118 or content distribution manager 112 by sending a traffic Application Programming Interface (API) with the vehicle location value 504 to a traffic service that provides real time traffic information.

Figure 6:
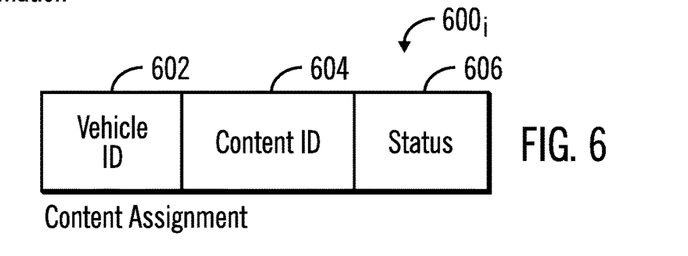
FIG. 6 illustrates an embodiment of a content assignment.

FIG. 6 illustrates an embodiment of an instance of a content assignment $600_i$ of the content assignments 600 indicating a vehicle ID 602 of a vehicle $104_i$ (or network address of a mobile communication device 118) at which the content identified by content ID 604 is to be rendered, and a status 606 indicating whether the content was rendered or not. For an assignment $600_i$, the vehicle attribute values, such as 504, 506, 508 in the vehicle information $500_i$, would satisfy the subscriber rendering criteria, such as 406, 408, 410 in the content instance information $400_i$ from the subscriber.

In certain embodiments, the subscriber database 300, vehicle database 500, and content assignments 600 may be implemented in relational database records in one or more tables having the information fields described in FIGS. 3, 4, 5, and 6. The databases 300, 500 and information 600 may also be implemented in other types of information stores, such as an object oriented database, structured document, etc.

Figure 7:
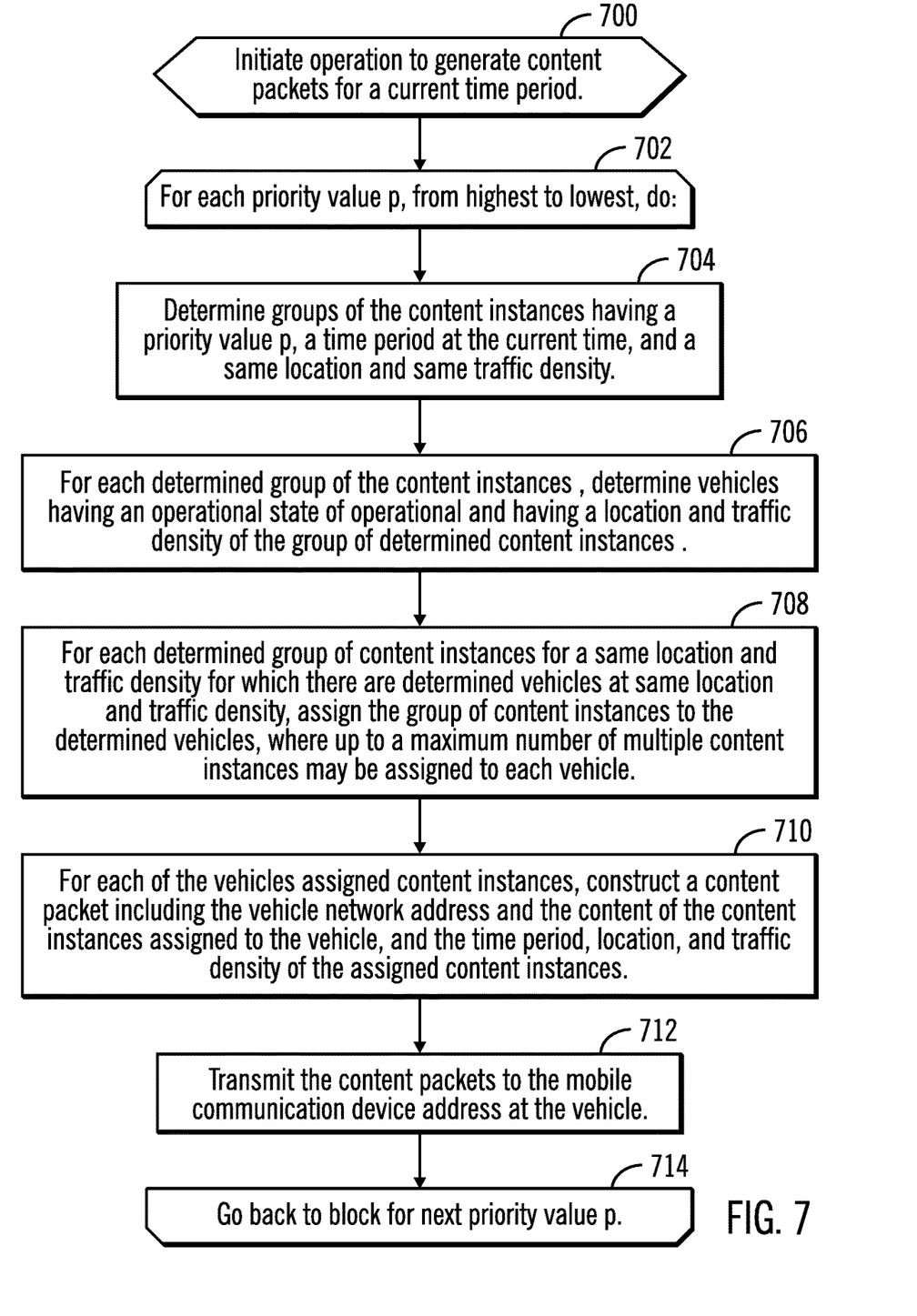
FIG. 7 illustrates an embodiment of operations to generate content packets to distribute content to vehicles to render on display screens at the vehicles.

FIG. 7 illustrates an embodiment of operations performed by the content distribution manager 112 to generate content packets 200 for a current time period from content provided by subscribers for the current time period. Upon initiating (at block 700) packet generating operations to distribute packets 200 to vehicles $104_1, 104_i \ldots 104_n$, the content distribution manager 112 performs a loop of operations at blocks 702 through 712 for each priority value p, from a highest priority value to a lowest priority value. At block 704, a determination is made of groups of content instances $400_i$, where each group has content instances with a priority value 412 of p, a time period 408 comprising the current time period, and a same location 406 and traffic density 410. For each determined group of content instances $400_i$, the content distribution manager 112 determines (at block 706) vehicles having an operational state 506 of operation and having a location 504 and within a traffic density 508 of those 406, 410 in the group of determined content instances being considered. For each determined group of content instances for a same location 406 and traffic density 410 for which there are determined vehicles at the same location 504 and traffic density 508, the content distribution manager 112 assigns (at block 708) the group of content instances to one or more of the determined vehicles in the determined group of content instances, where up to a maximum number of multiple content instances may be assigned to each vehicle. For each of the determined vehicles assigned content instances, the content distribution manager 112 constructs (at block 710) a content packet 200 including the vehicle network address 512 in field 202, the content 404 of the assigned content instances $400i$ assigned to the vehicle, and the time period 408, location 406, and traffic density 410 of the assigned content instances in fields 208, 210, and 212 of the packet $200_i$. If the packet 200 includes multiple content instances $204_1 \ldots 204_n$, then the mobile communication device 118 may alternate displaying the content for same or different durations, such as in a round robin fashion, looping through the content $204_1 \ldots 204_n$. The content distribution manager 112 transmits (at block 712) the content packets $200_i$ to their identified mobile communication device network address 202 to render the content $204_1 \ldots 204_n$ on the display screen $124_i$ at the motor vehicle at which the content packet $200_i$ is received.

With the embodiment of FIG. 7, computer operations are optimized by selecting content instances to assign to vehicles and transmit to the vehicles by first assigning content instances having a highest priority value so that higher priority value content instances are assigned and distributed to the mobile communication devices 118 in the assigned vehicles $104_1, 104_i \ldots 104_n$ before lower priority value content. Further, content instances are grouped by location and traffic density to allow determination of vehicles having matching location and traffic density to which the content instances are to be assigned to optimize the assignment of content instances to vehicles. Described embodiments provide real time calculations of location and traffic density for the vehicles to assign content based on current location 504 and traffic density values 508 at the vehicles, as indicated in vehicle information $500_i$, so that the content 404 is directed to vehicles currently satisfying the location 406 and traffic density 410 specified for the content 404 in the content instance information $400_i$. In this way, the described database information and data structures improves and optimizes the computer operations and algorithm to route and assign subscriber content to mobile communication devices at vehicles to render on display screens at the vehicles.

Figure 8:
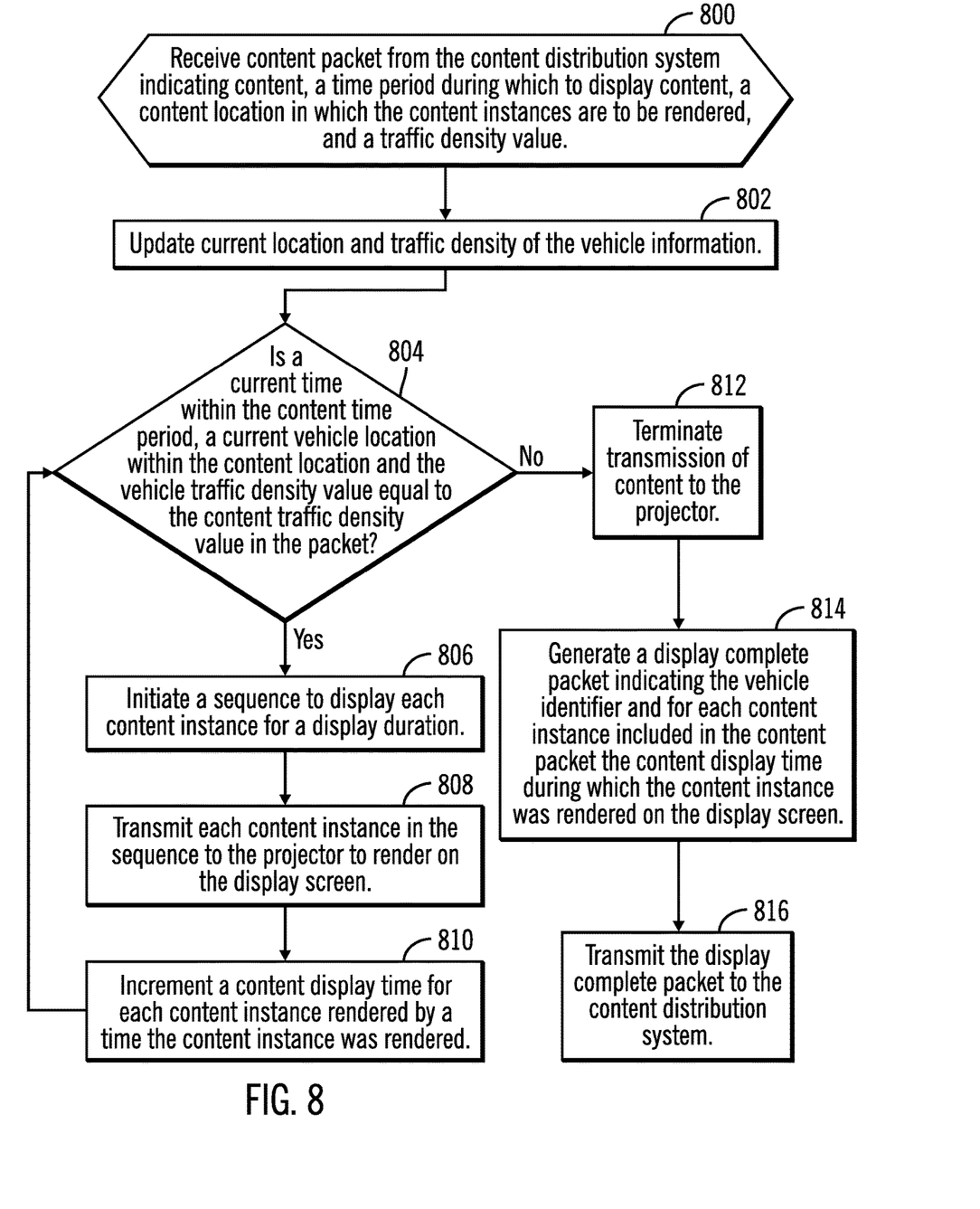
FIG. 8 illustrates an embodiment of operations to render content from content packets on a display screen coupled to the vehicle.

FIG. 8 illustrates an embodiment of operations performed by the content rendering program 120 in the mobile communication device 118 at a vehicle $104_i$ upon receiving a content packet $200_i$ including content $204_1 \ldots 204_n$, a time period during 208 which to display content, a content location 210 in which the content instances are to be rendered, and a traffic density value 212. Upon receiving (at block 800) the content packet $200_i$, a current location of the vehicle 502 and the vehicle traffic density value 508 may be updated (at block 802), such as from the GPS 126 in the mobile communication device 118 and by sending a command, via transceiver 128, to a network accessible traffic service site to obtain current traffic density. If (at block 804) the current time is within the content time period 208, a current vehicle location 504 within the content location 210, and the vehicle traffic density value 508 and the content traffic density value 212, i.e., the vehicle attributes satisfy the content packet attributes, then the content rendering program 120 initiates (at block 806) a sequence to display each content instance $204_1 \ldots 204_n$ for a display duration. Each content instance $204_1 \ldots 204_n$ is transmitted (at block 808) in the sequence to the projector 122 to render on the display screen $124_i$ while the vehicle is in motion, stuck in traffic or parked. A content display time is incremented (at block 810) for each content instance rendered by a time the content instance was rendered on the display screen $124_i$.

If (at block 804) the vehicle attribute values, such as current time, vehicle location 504, and vehicle traffic density 508, no longer satisfy the content time period 208, location 210, and traffic density 212 requirements, then the content rendering program 120 terminates (at block 812) transmission of the content to the projector to cease display of content on the display screen $124_i$. The content rendering program 120 generates (at block 814) a display complete packet indicating the vehicle identifier 502 and for each content instance rendered included in the acknowledgment packet, the content display time during which the content instance was rendered on the display screen $124_i$. The display complete packet is transmitted (at block 816) to the content distribution system 100.

With the described embodiment of FIG. 8, content is rendered on a display screen $124_i$ coupled to the vehicle $104_i$ that display the received content visible to people external to the vehicle $104_i$ looking at the display screen $124_i$, while the driver may be able to see a rear view of the road through the display screen $124_i$. Further, the content rendering program 120 in the mobile communication device 118 in the vehicle $104_i$ further terminates the display of the provided content if the rendering attributes are not satisfied, such as the time period during 208 which content is to be displayed, the content location 210 at which the content is to be displayed and/or a vehicle traffic density 508 is not the content traffic density 212 in which the content is to be rendered. Described embodiments provide improved computer technology to ensure that content is only rendered if rendering would satisfy requirements specified by subscribers by having the control of the rendering handled at the vehicle $104_i$ site.

Figure 9:
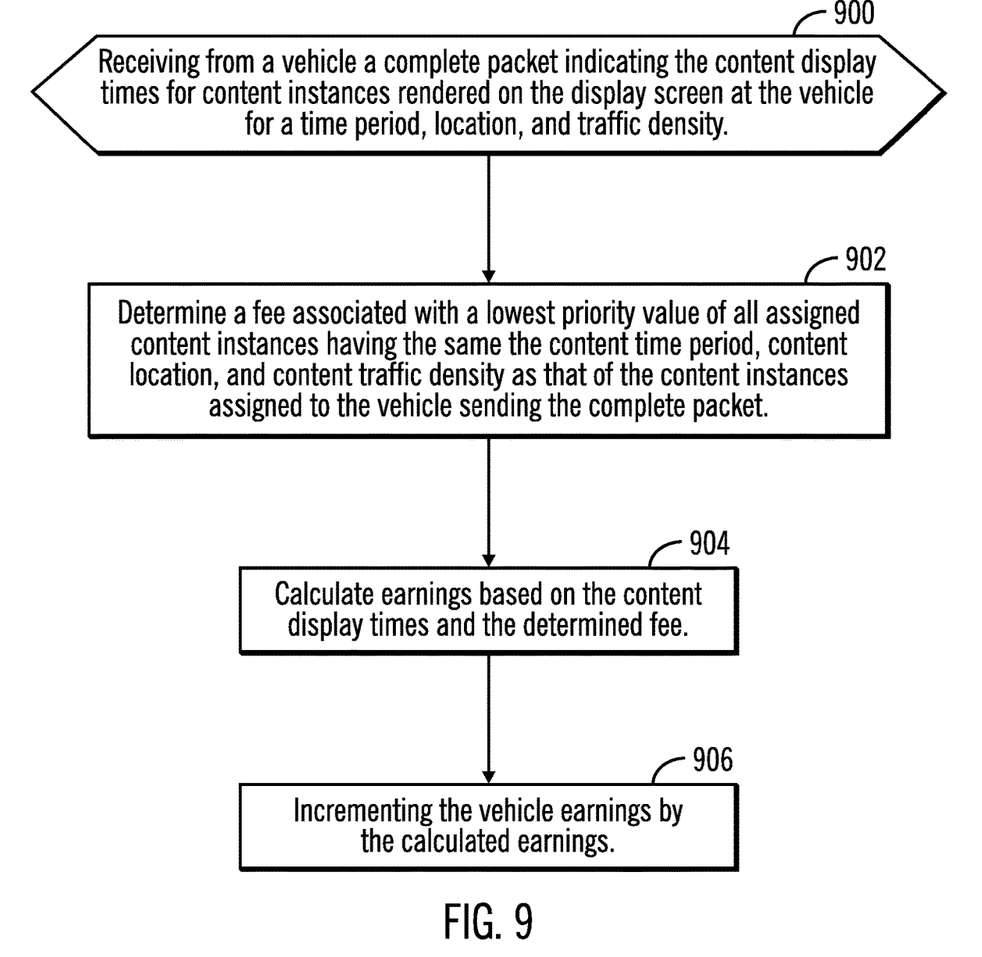
FIG. 9 illustrates an embodiment of operations to process a complete packet to determine fees to charge for content rendered at a vehicle.

FIG. 9 illustrates an embodiment of operations performed by the content distribution manager 112 upon receiving (at block 900) from a vehicle $104_i$ a complete packet indicating the content display times for content instances rendered on the display screen $124_i$ at the vehicle $104_i$ for a time period 208, location 210, and traffic density 212 specified for the rendering. The content distribution manager 112 determines (at block 902) a fee associated with a lowest priority value of all assigned content instances $400_j$, in the content assignments 600, having the same content time period 404, content location 406, and content traffic density value 410 as that of the content instances assigned to the vehicle sending the complete packet. If content instances for a same location, time period, and traffic density are distributed for different priority values, then a subscriber purchasing a higher priority value will only be charged commensurate with the subscriber purchasing at a lowest priority value who had content distributed to vehicles for the same time period, location, and traffic density. This ensures that all subscribers are charged a same amount, the fee associated with the lowest priority value having content distributed according to the same criteria, e.g., time period, location, and traffic density. Earnings for the vehicle/driver sending the complete packet are calculated (at block 904) based on the content display times and determined fee. The vehicle accrued earnings 510 are incremented (at block 906) by the calculated earnings.

With the embodiment of FIG. 9, even if subscribers paid different amounts for different priority values for content to render at a same time period, location, and traffic density, all subscribers having their content distributed for the same time period, location, and traffic density will be charged the same amount, at the level of the content having a lowest priority value, so that subscribers bidding at higher levels do not pay more for the same level of content distribution service. In this way, described embodiments provide improved computer technology for calculating charges and earnings to subscribers that ensure fairness in the charging of services.

Figure 10:
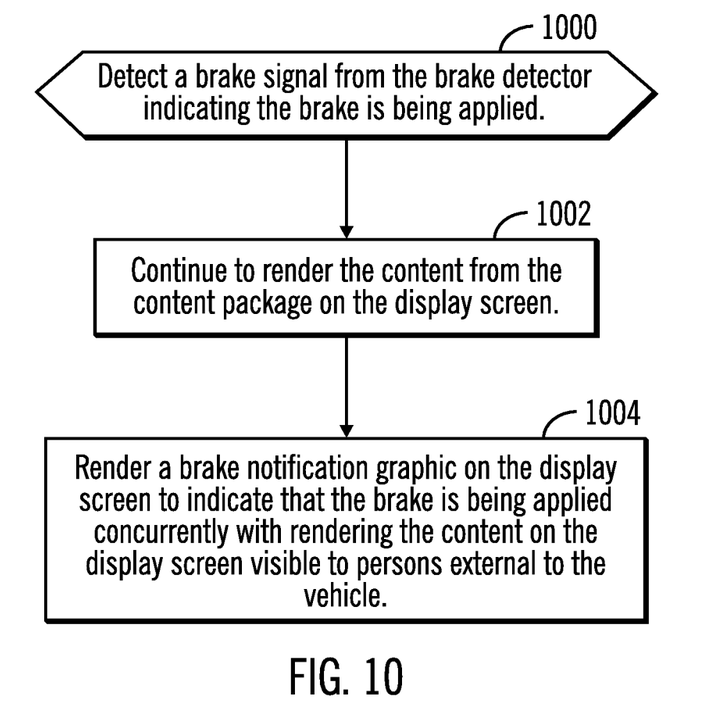
FIG. 10 illustrates an embodiment of operations at the vehicle to process a signal indicating the brakes at the vehicle are applied to display content and a brake notification.

FIG. 10 illustrates an embodiment of operations performed by the content rendering program 120 to process a brake signal from the brake sensor 130 indicating that brakes have been applied, such as through depression of the brake pedal. Upon detecting (at block 1000) a brake signal, the content rendering program 120 continues (at block 1002) to render content from a content package $200_i$ on the display screen $124_i$ The content rendering program 120 may further render (at block 1004) a brake notification graphic on the display screen $124_i$ concurrently with rendering the content $204_i$ on the display screen $124_i$.

With the embodiment of FIG. 10, if the brake is applied while content is being rendered on the display $124_i$, the content rendering program 120 continues to display $124_i$ the content, but also displays a brake notification to alert drivers behind the vehicle of application of the brake to improve safety.

The present invention may be a system, a method, and/or a computer program product. The computer program product may include a computer readable storage medium (or media) having computer readable program instructions thereon for causing a processor to carry out aspects of the present invention.

The computer program product comprises a computer readable storage medium implemented using standard programming and/or engineering techniques to produce software, firmware, hardware, or any combination thereof. The described operations may be implemented as code or logic maintained in a "computer readable storage medium". The term "code" and "program code" as used herein refers to software program code, hardware logic, firmware, microcode, etc. The computer readable storage medium, as that term is used herein, includes a tangible, physical element, including at least one of electronic circuitry, storage materials, a casing, a housing, a coating, hardware, and other suitable materials. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), computer encoded and readable punch cards, etc. The computer readable storage medium may further comprise a hardware device implementing firmware, microcode, etc., such as in an integrated circuit chip, a programmable logic device, a Programmable Gate Array (PGA), field-programmable gate array (FPGA), Application Specific Integrated Circuit (ASIC), etc. A computer readable storage medium is not comprised solely of transmission signals and includes physical hardware and tangible components. Those skilled in the art will recognize that many modifications may be made to this configuration without departing from the scope of the present invention, and that the article of manufacture may comprise suitable information bearing medium known in the art.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
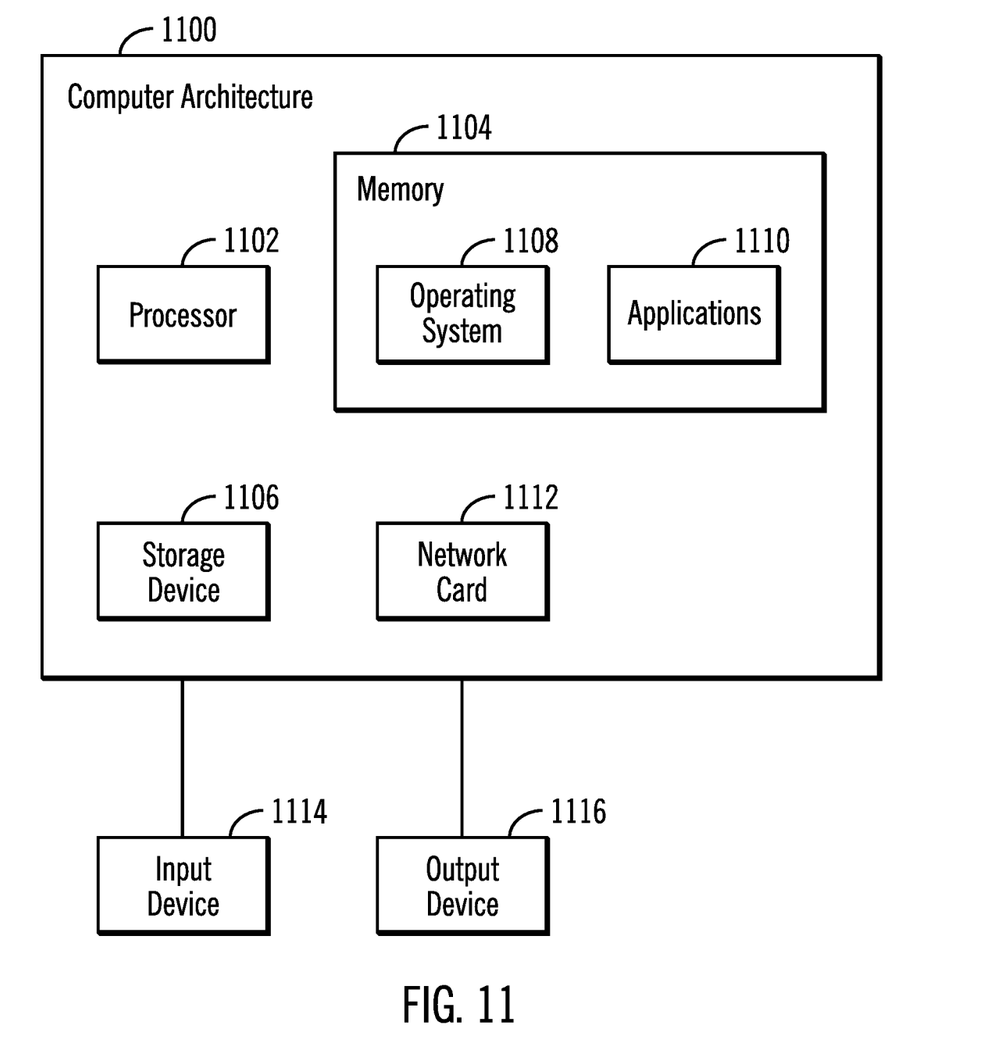
FIG. 11 illustrates a computing environment in which the components of FIG. 1 may be implemented

The computational components of FIG. 1, including the content distribution system 100 and the mobile communication device 118 may be implemented in one or more computer systems, having a computer architecture as shown in FIG. 11, and including a processor 1102 (e.g., one or more microprocessors and cores), a memory 1104 (e.g., a volatile memory device), and storage 1106 (e.g., a non-volatile storage, such as magnetic disk drives, solid state devices (SSDs), optical disk drives, a tape drive, etc.). The storage 1106 may comprise an internal storage device or an attached or network accessible storage. Programs, including an operating system 1108 and applications 1110 stored in the storage 1106 are loaded into the memory 1104 and executed by the processor 1102. The architecture 1100 further includes a network card 1112 to enable communication with the network 102, which may comprise a wireless network, e.g., cellular, WI-FI™, BLUETOOTH® or a wired network. An input device 1114 is used to provide user input to the processor 1102, and may include a keyboard, mouse, pen-stylus, microphone, touch sensitive display screen, or any other activation or input mechanism known in the art. An output device 1116, such as a display monitor, printer, storage, etc., is capable of rendering information transmitted from a graphics card or other component. The output device 1116 may render the GUIs described with respect to figures and the input device 1114 may be used to interact with the graphical controls and elements in the GUIs described above. The architecture 1100 may be implemented in any number of computing devices, such as a server, mainframe, desktop computer, laptop computer, hand held computer, tablet computer, personal digital assistant (PDA), telephony device, cell phone, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining content to transmit to vehicles to render, the computer program product comprising a non-transitory computer readable storage medium having computer readable program code embodied therein that is executable to perform operations, the operations comprising:

maintaining, in a vehicle database, vehicle information indicating, for each vehicle of a plurality of vehicles, a vehicle location value;

maintaining, in a subscription database, subscriber information for each of a plurality of subscribers, having content instances, wherein each content instance indicates content, a priority value of one of a plurality of priorities for the content, a content time period, and a content location at which the content is to be rendered during the content time period;

for each group of content instances in the subscriber information for the subscribers having a same content location and a content time period, determining vehicles having a vehicle location value within the same content location;

for each group of content instances having the same content location, assigning content instances having a higher priority value to the determined vehicles before assigning content instances having the same content location and a lower priority value, wherein there are a maximum number of content instances that can be assigned to each vehicle; and for each vehicle assigned the content instances, transmitting a content package having content from the assigned content instances to cause a display of the content on a display screen coupled to the vehicle to be viewed by people in a vicinity of the vehicle.

2. The computer program product of claim 1, wherein the operations further comprise:

for each vehicle assigned the content instances, generating the content package having the content, the same content location, and the content time period for the content to cause the content from the content instances to be rendered on the display screen of the vehicle until an end of the content time period and while the vehicle is located within the same content location.

3. The computer program product of claim 1, wherein a plurality of content instances for subscribers further indicate a content traffic density value at which the content is to be rendered, wherein the vehicle information for each vehicle indicates a vehicle traffic density value of a traffic density in an area of the vehicle, wherein for each group of content instances further having a same content traffic density value, the determined vehicles further have a vehicle traffic density value comprising the same content traffic density value.

4. The computer program product of claim 3, wherein the operations further comprise:

for each vehicle assigned the content instances, generating the content package having the content, the same content location, the content time period, and the content traffic density value for the content to cause rotating rendering of the content from the assigned content instances on the display screen of the vehicle until an end of the content time period and while the vehicle is located within the same content location and within traffic having the same content traffic density value.

5. The computer program product of claim 1, wherein the higher priority value and the lower priority value comprise prices paid by a subscriber to distribute the content at the content time period to the same content location, wherein the higher priority value is a higher price than the lower priority value.

6. The computer program product of claim 1, wherein the vehicle information indicates accrued earnings for a vehicle, wherein the operations further comprise:

receiving a complete packet indicating content display times for displaying content from content instances assigned to the vehicle having the display screen at which the content is displayed;

determining a fee associated with a lowest priority value of all assigned content instances having a same content time period and content location as that of the content instances having content identified in the complete packet;

calculating earnings based on the content display times and the determined fee; and incrementing the earnings by the calculated earnings.

7. A system for determining content to transmit to vehicles to render, comprising:

a processor; and a computer readable storage medium having computer readable program code embodied therein that when executed by the processor causes operations, the operations comprising:

maintaining, in a vehicle database, vehicle information indicating, for each vehicle of a plurality of vehicles, a vehicle location value;

maintaining, in a subscription database, subscriber information for each of a plurality of subscribers, having content instances, wherein each content instance indicates content, a priority value of one of a plurality of priorities for the content, a content time period, and a content location at which the content is to be rendered during the content time period;

for each group of content instances in the subscriber information for the subscribers having a same content location and a content time period, determining vehicles having a vehicle location value within the same content location;

for each group of content instances having the same content location, assigning content instances having a higher priority value to the determined vehicles before assigning content instances having the same content location and a lower priority value, wherein there are a maximum number of content instances that can be assigned to each vehicle; and for each vehicle assigned the content instances, transmitting a content package having content from the assigned content instances to cause a display of the content on a display screen coupled to the vehicle to be viewed by people in a vicinity of the vehicle.

8. The system of claim 7, wherein the operations further comprise:

for each vehicle assigned the content instances, generating the content package having the content, the same content location, and the content time period for the content to cause the content from the content instances to be rendered on the display screen of the vehicle until an end of the content time period and while the vehicle is located within the same content location.

9. The system of claim 7, wherein a plurality of content instances for subscribers further indicate a content traffic density value at which the content is to be rendered, wherein the vehicle information for each vehicle indicates a vehicle traffic density value of a traffic density in an area of the vehicle, wherein for each group of content instances further having a same content traffic density value, the determined vehicles further have a vehicle traffic density value comprising the same content traffic density value.

10. The system of claim 9, wherein the operations further comprise:
for each vehicle assigned the content instances, generating the content package having the content, the same content location, the content time period, and the content traffic density value for the content to cause rotating rendering of the content from the assigned content instances on the display screen of the vehicle until an end of the content time period and while the vehicle is located within the same content location and within traffic having the content traffic density value.

11. The system of claim 7, wherein the higher priority value and the lower priority value comprise prices paid by a subscriber to distribute the content at the content time period to the content location, wherein the higher priority value is a higher price than the lower priority value.

12. The system of claim 7, wherein the vehicle information indicates accrued earnings for a vehicle, wherein the operations further comprise:
receiving a complete packet indicating content display times for displaying content from content instances assigned to the vehicle having the display screen at which the content is displayed;
determining a fee associated with a lowest priority value of all assigned content instances having a same content time period and content location as that of the content instances having content identified in the complete packet;
calculating earnings based on the content display times and the determined fee; and
incrementing the earnings by the calculated earnings.

13. A method for determining content to transmit to vehicles to render, comprising:
maintaining, in a vehicle database, vehicle information indicating, for each vehicle of a plurality of vehicles, a vehicle location value;
maintaining, in a subscription database, subscriber information for each of a plurality of subscribers, having content instances, wherein each content instance indicates content, a priority value of one of a plurality of priorities for the content, a content time period, and a content location at which the content is to be rendered during the content time period;
for each group of content instances in the subscriber information for the subscribers having a same content location and a content time period, determining vehicles having a vehicle location value within the same content location;
for each group of content instances having the same content location, assigning content instances having a higher priority value to the determined vehicles before assigning content instances having the same content location and a lower priority value, wherein there are a maximum number of content instances that can be assigned to each vehicle; and
for each vehicle assigned the content instances, transmitting a content package having content from the assigned content instances to cause a display of the content on a display screen coupled to the vehicle to be viewed by people in a vicinity of the vehicle.

14. The method of claim 13, further comprising:
for each vehicle assigned the content instances, generating the content package having the content, the same content location, and the content time period for the content to cause the content from the content instances to be rendered on the display screen of the vehicle until an end of the content time period and while the vehicle is located within the same content location.

15. The method of claim 13, wherein a plurality of content instances for subscribers further indicate a content traffic density value at which the content is to be rendered, wherein the vehicle information for each vehicle indicates a vehicle traffic density value of a traffic density in an area of the vehicle, wherein for each group of content instances further having a same content traffic density value, the determined vehicles further have a vehicle traffic density value comprising the same content traffic density value.

16. The method of claim 15, further comprising:
for each assigned vehicle the content instances, generating the content package having the content, the content location, the content time period, and the content traffic density value for the content to cause rotating rendering of the content from the assigned content instances on the display screen of the vehicle until an end of the content time period and while the vehicle is located within the content location and within traffic having the same content traffic density value.

17. The method of claim 13, wherein the higher priority value and the lower priority value comprise prices paid by a subscriber to distribute the content at the content time period to the content location, wherein the higher priority value is a higher price than the lower priority value.

18. The method of claim 13, wherein the vehicle information indicates accrued earnings for a vehicle, further comprising:
receiving a complete packet indicating content display times for displaying content from content instances assigned to the vehicle having the display screen at which the content is displayed;
determining a fee associated with a lowest priority value of all assigned content instances having a same content time period and content location as that of the content instances having content identified in the complete packet;
calculating earnings based on the content display times and the determined fee; and
incrementing the earnings by the calculated earnings.

* * * * *